United States Patent
Döring et al.

(10) Patent No.: US 10,638,772 B2
(45) Date of Patent: May 5, 2020

(54) DEMINERALIZED WHEY POWDERS

(71) Applicant: DMK Deutsches Milchkontor GmbH, Zeven (DE)

(72) Inventors: Sven-Rainer Döring, Zeven (DE); Thorben Oehlckers, Buchholz (DE); Torben Wiegers, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 318 days.

(21) Appl. No.: 15/472,773

(22) Filed: Mar. 29, 2017

(65) Prior Publication Data
US 2017/0280738 A1    Oct. 5, 2017

(30) Foreign Application Priority Data
Mar. 30, 2016    (EP) .................... 16163027

(51) Int. Cl.
*A23C 9/15* (2006.01)
*A23C 21/00* (2006.01)
*A23C 9/142* (2006.01)
*A23J 1/20* (2006.01)
*A23C 9/146* (2006.01)
*A23L 33/00* (2016.01)
*A23C 9/144* (2006.01)
*A23C 9/148* (2006.01)
*A23C 9/152* (2006.01)

(52) U.S. Cl.
CPC ............ *A23C 9/1512* (2013.01); *A23C 9/144* (2013.01); *A23C 9/148* (2013.01); *A23C 9/1422* (2013.01); *A23C 9/1425* (2013.01); *A23C 9/1427* (2013.01); *A23C 9/1465* (2013.01); *A23C 9/152* (2013.01); *A23C 21/00* (2013.01); *A23J 1/205* (2013.01); *A23L 33/40* (2016.08)

(58) Field of Classification Search
CPC ... A23C 9/1512; A23C 9/1422; A23C 9/1425; A23C 9/1427; A23C 9/144; A23C 9/1465; A23C 9/148; A23C 9/152; A23C 21/00; A23L 33/40; A23J 1/205
USPC ................................ 426/491, 580, 583, 657
See application file for complete search history.

(56) References Cited

U.S. PATENT DOCUMENTS 6,033,700 A    3/2000 Berrocal et al.
2009/0142459 A1    6/2009 Batchelder

FOREIGN PATENT DOCUMENTS

CN    102 898 516 A    1/2013

OTHER PUBLICATIONS

CN 102898516A, translation, Jan. 2013.*

* cited by examiner

*Primary Examiner* — Leslie A Wong
(74) *Attorney, Agent, or Firm* — Dilworth & Barrese, LLP

(57) ABSTRACT

A demineralised whey powder is suggested which is obtainable by:
  (a) Separating raw milk, removing the cream;
  (b) Subjecting the skimmed milk such obtained to microfiltration or microdiafiltration, obtaining a whey protein-rich permeate P1 and a retentate R1 containing casein and GMP in the process;
  (c) Subjecting the permeate P1 to column chromatography separation, in which the lactoferrin contained therein remains on the column;
  (d) Subjecting the permeate, from which lactoferrin had been removed, to dialysis; and
  (e) Dehydrating the diluate such obtained.

10 Claims, 1 Drawing Sheet

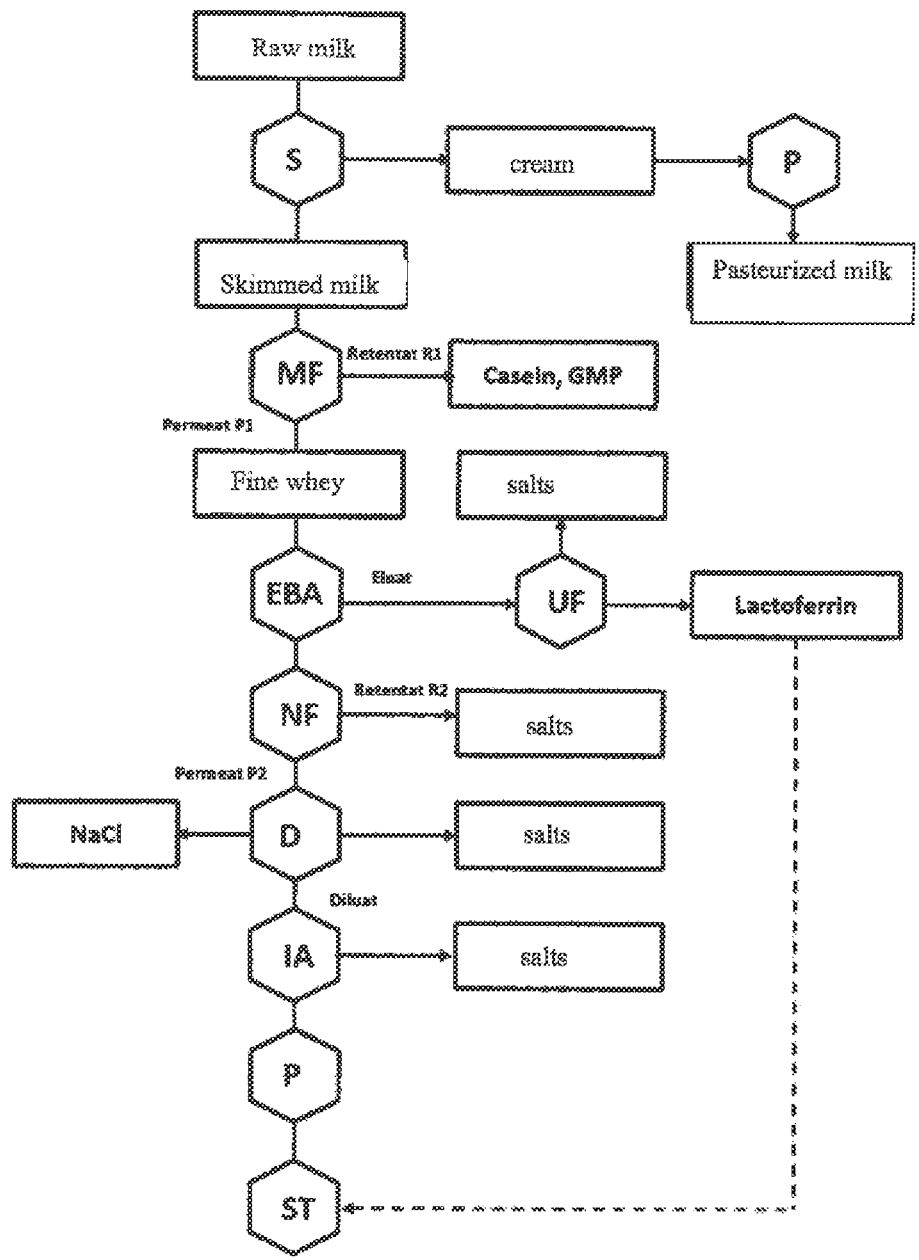

ated powder, which was generally# DEMINERALIZED WHEY POWDERS

FIELD OF THE INVENTION

The invention is in the field of dairy products and relates to a demineralised whey powder, a process for its production and its use for the production of infant formula.

STATE OF THE ART

Justus von Liebig developed the first instant formula for babies already in the year 1865, initially in liquid form as "soluble food for infants". Some time later, he marketed an instant formula in powder form, which was generally referred to as Kindermehl (infant cereal). Both products were sold in several European countries starting in 1866, with Liebig's reputation certainly contributing to the sales success. Liebig's products were firstly sold in pharmacies and partly manufactured there, offering them as finished products due to their complicated production. In Munich, two pharmacists offered freshly produced Liebig's soluble formula in individual units. In 1866/67, one of them alone sold 30,000 units within eleven months. The trained pharmacist's assistant Henri Nestlé added condensed milk to Liebig's formulation and marketed the powder after testing it in two infants, calling it Henri Nestle's Farine Lactée in 1868. In the year 1874, 670,000 cans thereof were sold in 18 countries. Infant cereals were considered to be unsuitable for the nutrition of infants in their first months of life. The mixtures developed by Liebig and Nestlé are considered to be the origin of all infant formula products to this day.

In 1932, the company MILUPA joined the production of infant formulas with Paulys Nährspeise, which consisted of rusk flour dissolved in milk. Günther Malyoth, a pediatrician in Munich, developed a "nutritional sugar for infants" of the name ALETE in 1934. In Germany, it was customary to feed infants milk with oat flakes. In the 1950ies, so-called instant oats were put on the market. In the post-war period there were attempts to adapt milk preparations more closely to the composition of mother's milk, selling them as "humanised" or "adapted". In the mid-1950ies, the first vegetable purées for babies were put on the market in cans, filled into glass jars since 1959. In 1959, ready-made seminola pudding was available from MILUPA; in 1964, the company developed the first synthetic milk called MILUMIL.

Today it is known in the development of modern infant formula that, with about 377 kJ (=90 kcal) per kilogram of body weight, the daily energy requirement of infants is between two and three times higher than that of adults as a result of growth. In order to cover this requirement, the fat content of food must amount to between 35 and 50 percent, with a carbohydrate content of only about 45 percent. Percentagewise, also the protein requirement is higher than in adults, amounting to between 2.0 to 2.7 grams per kilogram of body weight daily until the age of two months, then between 1.1 and 1.5 grams (adults: 0.8 g). Their fluid requirement is also greater, as the kidneys are not fully developed yet, and more liquid is lost via respiration and via the skin.

For example, EP 2730170 B1 (DMK) discloses allergen-free foods which may also be used for the nutrition of infants and which are obtainable by microfiltrating skimmed milk, and by ultrafiltrating, concentrating, hydrolysing, pasteurising and spray-drying the resulting fine whey.

In the first months of life, digestion only works to a limited degree; newborns do not have any intestinal flora yet, and also their intestinal mucosa is not fully developed yet; dairy products with a high lactoferrin content may, therefore, considerably damage the infant, as they have an anti-bacterial effect and adversely affect the slowly developing intestinal flora. Also, the body forms some of the enzymes that are necessary for the digestion of food only at a later stage. For these reasons, babies in their first phase of life should only be fed mother's milk or first infant formula (first/infant milk). Follow-on formula (follow-on milk) and complimentary food should not be given in the first six months of life. With the fifth month at the earliest, and with the seventh month at the latest, also mother's milk alone is not capable of fully meeting the complete nutritional requirements of the infant.

According to legal provisions, infant formula must not contain any bacteria or any harmful substances. It is subject to the German Dietary Food Directive and must therefore contain defined maximum amounts of fat and carbohydrates and certain minimum amounts of minerals and vitamins. As a consequence, whey which could constitute a valuable raw material for infant nutrition due to its high protein content is only used to a limited degree, as it contains undesired protein-degradation products from the process of curding and typically exhibits too many milk minerals, and it is therefore not possible that it conforms to the dietary provisions in this manner. A further disadvantage is that the amino acid sequence of whey proteins does not include sufficient essential amino acids.

The object of the present invention was therefore to provide whey, specifically whey powder in a new quality, having an increased portion of essential amino acids and a considerably reduced portion of minerals at the same time, particularly a distinctly reduced sodium content. At the same time, the products should be free of undesired products such as GMP and byproducts from the curding, and exhibit lactoferrin, if at all, in such amounts that these are not adversely affecting the intestinal flora of an infant.

DESCRIPTION OF THE INVENTION

A first subject-matter of the invention relates to a demineralised whey powder, which is obtainable by:
(a) Separating raw milk and skimming the cream;
(b) Subjecting the skimmed milk such obtained to microfiltration or microdiafiltration, obtaining a whey protein-rich permeate P1 and a retentate R1 containing casein and GMP in the process;
(c) Subjecting the permeate P1 to column-chromatography separation, in which the lactoferrin contained therein remains on the column;
(d) Subjecting the permeate, from which lactoferrin was such removed, to dialysis; and
(e) Dehydrating the diluate such obtained, or, respectively, in a preferred embodiment,
(a) Separating raw milk and skimming the cream;
(b) Subjecting the skimmed milk such obtained to microfiltration or microdiafiltration, obtaining a whey protein-rich permeate P1 and a retentate R1 containing casein and GMP in the process;
(c) Subjecting the permeate P1 to column-chromatography separation, in which the lactoferrin contained therein remains on the column;
(d) Subjecting the permeate, from which lactoferrin was such removed, to nanofiltration, obtaining a permeate P2 and a retentate R2 in the process;
(e) Subjecting the permeate P2 to electrodialysis;
(f) Demineralising the diluate such obtained by means of a cation exchanger;

(g) Pasteurising the demineralised diluate such obtained;
(h) Dehydrating the pasteurised diluate such obtained; and, optionally
(i) Enriching it with defined amounts of additives.

In comparison with regular whey powders as used for the production of infant formula, the powders according to the invention exhibit numerous advantages, particularly the following ones:

They do not contain any casein, GMP, rennet, cheese making cultures, and any protein-degradation products resulting thereof;

They do not contain any lactoferrin, or their lactoferrin content is reduced such that the remaining amount does not adversely affect the intestinal flora of the infant;

They have a content in essential amino acids that is by ca. 20% higher; and

The mineral content, particularly the sodium content is up to 90% below the values found in products of the state of the art.

Therefore, the products of the present invention in powder form are particularly suitable for the production of infant formula. For example, by mixing the products of the invention with raw milk it is possible to manufacture a product which corresponds to mother's milk with regard to its casein/whey protein ratio or at least gets very close to it.

BRIEF DESCRIPTION OF THE DRAWING

The present invention will be described in greater detail with reference to the accompanying drawing which is a flow chart illustrating the method according to the present invention.

METHOD OF PRODUCTION

A further subject-matter of the present invention relates to an analogous process for the production of a demineralised whey powder, comprising the following steps:
(a) Separating raw milk into skimmed milk and cream;
(b) Microfiltrating or microdiafiltrating the skimmed milk, obtaining a protein-rich permeate P1 and a retentate R1 containing casein and GMP;
(c) Separating the lactoferrin from the permeate P1 by means of column chromatography;
(d) Dialysing the permeate P1, from which lactoferrin had been removed;
(e) Drying the diluate, obtaining a product in powder form.

The various process steps are explained in more detail in the following.

Separation

In the process according to the invention it is advantageous to perform the separation step (step a) cold. In doing so, it is advantageous if the temperature of the cold condition of the raw milk is adjusted to a value that is optimal for separation by means of heat exchange using a heat carrier medium. Usually, the raw milk is available in a cooled condition at a temperature that does not correspond to the value at which cold separation can be performed most effectively and most gently with respect to the milk fat (cream). It is, therefore, adapted to the value that is optimal for separation by means of heat exchange. The exchanged cold temperature from the process may be made available to other processes that are carried out in a dairy, particularly by a so-called heat exchanger. For example, the temperature of the cooled raw milk does not exceed 6° C., while the optimum temperature for cold separation is in the range from 8 to 15° C. and particularly from 8 to 12° C. In this case, heat exchange is performed by heating the raw milk, so that the temperature of the cold condition thereof is increased to a value within this range. In dairies there is usually excess heat. Therefore, low-temperature water obtained in dairy processes can be used as a heat carrier medium for heating. Said low-temperature water is supplied to the heat exchange process at a temperature which is, for example, in the range of 35° C., and is then cooled down by heat exchange to a temperature which is, for example, in the range from 11 to 15° C. In doing so, the process of the invention provides an important cold source for dairy processes.

The separation of solids and the skimming of a fat content of about 4% by weight is usually carried out in a downstream component, preferably a separator. Said components are adequately known from the state of the art. Separators of the company GEA Westfalia Separator GmbH, which allow the joint or single separation of solids (http://www.westfalia-separator.com/de/anwendungen/molkereitechnik/milch-molke.html), are widely used in the dairy industry. Preferred cold milk separators are marketed by the manufacturer under the name "Procool". Corresponding components have been disclosed, for example, in DE 10036085 C1 and DE 10361526 B3 (Westfalia), and are perfectly known to one skilled in the art. Therefore, no explanations are needed on how to carry out these process steps, as they are understood to be part of the general specialist knowledge.

Microfiltration or Diafiltration

The process of the invention contains a mandatory filtration step, namely, a microfiltration or microdiafiltration step (step b) of the skimmed milk, by means of which casein and glycomacropeptides (GMP) are removed. The second filtration step is optional and represents a nanofiltration step, by means of which the permeate P1, from which the lactoferrin had been removed, is to be further desalinated and concentrated.

The essential difference between microfiltration/diafiltration and nanofiltration is in the different pore sizes and in the different membrane structure as well as in the materials and filter materials involved. A filtration through membranes having a pore size <0.1 μm is usually referred to as nanofiltration or ultrafiltration, while a filtration at pore sizes >0.1 μm, specifically from about 0.1 to 1 μm is usually referred to as microfiltration or diafiltration. In both cases this concerns purely physical, i.e. mechanical, membrane separation methods which apply the principle of mechanical size exclusion: all particles in the fluids which are larger than the membrane pores are retained by the membrane. The driving force in both separation methods is the differential pressure between the inlet and the outlet of the filter area, which is between 0.1 and 10 bar. Depending on the area of application, the filter area material may consist of stainless steel, synthetic material, ceramics or textile fabric. Filter elements appear in different forms: candle filters, flat membranes, spiral coil membranes, bag filters and hollow fibre modules, all of which are, in principle, suitable within the meaning of the present invention.

Column Chromatography

Column chromatography (step c) serves to separate lactoferrin, to purify it and to add it to the finished product again in a defined but comparable lower amount at a later point in time. Common absorption columns are suitable for separation, as they are adequately known to the skilled person from the state of the art.

However, what is referred to as Expanded Bed Adsorption (EBA) proved to be particularly advantageous. The principles according to which proteins are bound according to this method, in principle, do not differ from the ones of classic column chromatography or ion exchange technology. However, where classic column chromatography uses a solid phase in form of a packed bed, EBA uses the particles in a fluidised state, i.e. in a type of fluidised bed, in the process of which the volume ideally expands by factor 2. It is further significant that the particles exhibit different sizes and densities, as a result of which a particle size gradient is formed during the expansion of the bed. Additionally, local turbulences are formed in the fluidised bed in this process. This leads to the fact that particularly components exceeding a particular size or having the tendency to agglomerate flow through the fluidised bed, which would not be possible in a solid packed bed.

In EBA, the columns which are preferably solid matter adsorption columns are filled with the adsorbents from above. These are, on the one hand, a non-permeable material of a high density, and an ion exchanger resin that is capable of binding proteins, on the other. The non-permeable material, preferably, has a density of at least 1.5 g/ml and/or a particle size of 150 µm at most, and particularly from 40 to 120 µm. Common examples thereof are glass or metal pearls, specifically tungsten, which should exhibit different diameters and densities in order to produce the corresponding gradient in the fluidised bed as described above. This material constitutes the carrier in the fluidised bed.

The second part of the adsorber is an ion exchange resin which is capable of binding proteins. For example, a sulfonic acid anion exchange resin on a polysaccharide basis is suitable as described in EP 1401289 B1 (example 3).

In principle, carriers and ion exchangers can be filled into the column one after the other, or together. It is also possible to cover the carriers with the resins. After filling, the carrier materials form a densely packed bed that will not provide much room for any large aggregates to pass through. As soon as the bed is transited to the fluidised state, for example, by stirring the packed bed with a magnetic stirrer, and the sink rate corresponds to the upward flow, the carriers form a stable concentration gradient. The aim is to adapt a flux in which the velocity of the substances that are to be separated is larger than the one of the carrier particles. The carriers are often also provided with a quartz or a metal core in order to increase the differences in the upward velocities.

To remove impurities, it has proved to be advantageous that the EBA column is equilibrated, for example, with water or a buffer solution, before and after loading with the cold-separated skimmed milk. Further advantageous embodiments of this process step consist in that The cold-separated skimmed milk is applied with a flux rate from about 3 to about 50 cm/min; and/or The non-permeable material of a high density and the ion exchanger resin which is capable of binding proteins is used in a weight ratio from about 20:80 to about 50:50; and/or The adsorbent consisting of the non-permeable material of a high density and the ion exchanger resin which is capable of binding proteins is used in a v/v ratio from about 1:100 to about 1:1,000, and preferably from about 1:250 to about 1:500 in relation to the cold-separated skimmed milk to be loaded on the EBA column.

After completing this task, the fluidised state is terminated and the packed bed is allowed to set again. Then the column is rinsed with water, followed by the actual desorption of the lactoferrin, preferably in countercurrent mode, i.e. from bottom to top, in the process of which diluted bases are preferably used as eluents. It has proved to be particularly advantageous with respect to the increase of the yield if diluted bases are used for this purpose. Diluted (e.g., 0.1 M) sodium hydroxide is an excellent system which may optionally also include a buffer.

Thus the process of the invention comprises as an additional element a step, according to which the lactoferrin is eluated from the column, salts are removed from the eluate, which is then dried, and the pure lactoferrin is subsequently added to the demineralised whey powder in defined amounts again.

Nanofiltration or Reverse Osmosis

As already mentioned above, the process according to the invention contains an additional step as an optional measure, in which the permeate P1, from which lactoferrin had been removed, is subjected to nanofiltration or reverse osmosis, the retentate R2 which contains the milk minerals is retained for further use, and the demineralised permeate P2 is subsequently dialysed. Preferably, in this process nanofiltration is carried out with a membrane having a pore size in the range from about 150 to about 1,000 nm.

This step particularly serves to reduce the amount of product being subjected to dialysis in order to keep the dialysis cell small. Alternatively, it is therefore also possible to concentrate the permeate P1, from which lactoferrin had been removed, by evaporation before dialysis.

Dialysis

Dialysis (step d) is, preferably, an electrodialysis step. It is an electrochemically driven membrane process, in which ion exchanger membranes are used in combination with an electric potential difference to separate ionic species from uncharged solvents or from impurities.

To this end, the space between two electrodes in an electrodialysis separator is separated by a stack of alternating anion and cation exchanger membranes. Each pair of ion exchanger membranes forms a separate "cell". In technical systems, these stacks consist of more than two hundred membrane pairs. If a direct electric current is applied to the electrodes, the anions migrate to the anode. The anions may simply pass the positively charged anion exchanger membranes but they are stopped at the respective next negatively charged cation exchanger membrane. As the same process (obviously with opposite signs) is performed with the cations, the net effect of electrodialysis is a concentration of salts in the cells with odd numbers (anion exchanger membrane/cation exchanger membrane), while the cells with even numbers (cation exchanger membrane/anion exchanger membrane) suffer a depletion of salt. The solutions with increased salt concentrations are combined to form the concentrate, while the depleted solutions form the diluate.

It is recommended to finally treat the diluate with a cation exchanger ("polisher"), and, particularly, separate any introduced sodium ions by dialysis.

Pasteurisation

It is recommended to subject the product of dialysis to pasteurisation before drying, as the product is still "raw" and has not been heated yet. This is preferably performed in heat exchangers, in which case, specifically, plate heat exchangers have proved to be particularly suitable. There is a temperature gradient at the heat exchangers, which, however, is selected such that the product is heated to a temperature from about 70 to 80° C. and particularly from about 72 to 74° C. for a residence time of a minimum of 20 and a maximum of 60 seconds, preferably about 30 seconds.

Direct Steam Injection

In a first alternative embodiment, the product of dialysis may also be pasteurised by Direct Steam Injection (DSI).

This has the advantage that the slow passing of a range of temperature in which mesophilic and thermophilic spores find optimum growth conditions is significantly reduced by ultra-fast heating. This is achieved by a direct injection of hot or even super-hot steam which may have a temperature from 100 to about 250° C. This is commonly performed by means of nozzles, which either immerse directly into the product or are incorporated in a discharge of the heat exchanger.

The principle of DSI consists in guiding a pressurized steam jet into a nozzle chamber, which then releases its energy through a perforated tube ("Radial Steam Jet Diffuser") into the liquid product which is to be heated. The high-pressure stream creates a radial heat exchange field which is expanding at a high velocity, by means of which a uniform heating of the product is achieved at a very short time.

The object is to heat up the dairy product to a precise temperature within a very short time, preferably from 1 to about 5 seconds, particularly from 1 to 2 seconds. To this end, it is necessary to inject a possibly precise amount of steam into the product at a high velocity. If the amount of steam is controlled by a pressure reducing valve, the velocity of the steam typically falls below the velocity of sound, as a result of which the product does not heat up fast enough. To prevent this, the steam within the meaning of the process of the invention is preferably injected under what is referred to as "choke-flow" conditions, because this allows to inject steam directly into the product to be heated also at ultrasonic velocity. This is understood to be the phenomenon by which steam velocity is increased by creating a pressure difference by means of a particular nozzle. Corresponding components are commercially available, for example, from the company ProSonics.

DSI does not require any pre-heating of the raw material, i.e. the product of dialysis can be immediately used. However, the smaller the temperature differences, the more precise the temperature control.

Infusion

In a second alternative embodiment, the product of dialysis can also be pasteurised by means of (steam) infusion. This method has been known since the 1960ies. In principle, heating can be performed in two steps, in the process of which the material to be heated is injected into a pressure chamber filled with hot steam, and heating or pasteurising is performed on the falling path of the droplets. However, the significance of the so-called PDX process has increased since the year 2000. Here, the material to be heated is vaporised and suddenly heated in a stream of ultra-hot steam. The stream of steam that is moving forward at ultrasonic velocity homogeneously distributes the product droplets, so that a multi-phase stream is created, while heating is very gently taking place only at the interfacial areas of the droplets. In this manner, a condensation of the droplets is effected at the same time. In doing so, the steam may have a temperature from about 100 to about 250° C. and particularly from about 120 to about 150° C., infusion requires a period of typically 1 to 5 and particularly about 2 to 3 seconds.

In a further preferred embodiment, infusion heating is performed such that product and steam are alternately sprayed into a reactor via concentric ring nozzles, so that a steam pressure gradient is created from the inside out. As a result, the droplets are kept off the wall and will not burn.

Drying

In the last process step, the preferably pasteurised product of dialysis is dried (step e). Spray drying is preferably used here, with the temperature in the inlet typically ranging from about 180 to about 260° C. and from about 80 to about 105° C. at the outlet. Therefore, the pasteurised products do not require any cooling before entering the spray tower. Here, temperatures from 60 to 70° C. are even preferred, as this decreases the risk of denaturating the proteins. Alternatively, the products may also be dehydrated by freeze drying.

Further additives may be added to the products before, but preferably after spraying such as, for example, lactoferrin, lecithins, vitamins or food emulsifiers [EP 1314367 A1, NESTLE] and the like.

INDUSTRIAL APPLICATION

A further subject matter of the invention relates to the use of the whey powder of the invention for the production of infant formula, particularly for imitating mother's milk.

EXAMPLES

Example 1

Solids were removed from 330 kg of pre-cooled raw milk in a separator at 8° C., which was then skimmed. In this process, 300 kg of skimmed milk and 30 kg of cream were obtained, which was subsequently pasteurised by ultra-high temperature treatment and further processed.

The skimmed milk was heated to about 55° C. and then supplied to a microfiltration unit, into which it was placed together with 100 kg diafiltration water through a membrane with an average pore size of 0.1 µm. 66 kg of retentate were obtained, which was 90% casein and also contained the complete amount of glycomacropeptides (GMP) and germs. As this fraction is temperature-stable, it was possible to subject it to pasteurisation under standard conditions (72° C., 15 seconds), in the process of which a casein protein concentrate was obtained.

333 kg of permeate were obtained, which had a dry matter of about 5.5% by weight and a lactoferrin content of about 100 mg/kg (correspondingly, about 300 g). The permeate was applied to an EBA column ($\eta$=0.8) in the process of which the lactoferrin and a part of the salts contained therein were adsorbed. The absorbed lactoferrin was eluated with 0.1 regular NaOH buffer solution, desalinated by means of ultrafiltration, and the resulting retentate was dried. About 260 g pure lactoferrin was obtained, which was finally added to the whey powder in a defined amount again.

The whey (333 kg), from which lactoferrin was removed, exhibited a proportion of essential amino acids which was by 22% higher compared with the starting value, and was supplied to a nanofiltration unit which had a pore size of about 800 nm; the volume concentration factor (VCF) was 4. 249 kg of retentate were obtained, which contained a large proportion of the milk minerals, as well as 83 kg permeate, which was subjected to electrodialysis. Using about 115 kg of sodium chloride solution, 76 kg of dialysis product were obtained, from which any introduced sodium ions were removed in a cation exchanger.

The resulting amount of product corresponded to a "humanised cow's milk", which was then initially pasteurised and then subjected to spray drying at 120° C. 16 kg of whey powder were obtained, the mineral content of which was by 90% lower than the one of standand whey products.

The process is illustrated in the following FIG. 1 by a flow chart where: S=separation, P=pasteurisation; MF=microfiltration; EBA=Expanded Bed Absorption;

UF=ultrafiltration; NF=nanofiltration; D=electrodialysis; IA=ion exchanger; ST=spray drying.

The invention claimed is:

1. A process for the production of a demineralised whey powder, comprising the following steps:
 (a) separating raw milk into skimmed milk and cream;
 (b) microfiltrating or microdiafiltrating the skimmed milk with a membrane having a pore size in the range from about 0.1 to about 1 μm, obtaining a whey protein-rich permeate P1 and a retentate R1 containing casein and GMP;
 (c) subjecting the permeate P1 to column chromatography separation, in which lactoferrin contained therein remains on the column;
 (d) subjecting the permeate P1, from which lactoferrin had been removed, to nanofiltration or reverse osmosis and retaining thus-obtained retentate R2 which contains milk minerals, wherein the nanofiltration is performed with a membrane having a pore size in the range from about 150 to about 1,000 nm;
 (e) dialysing thus-obtained permeate P2 in step (d) from which lactoferrin had been removed by subjecting the permeate P2 to electrodialysis;
 (f) treating thus-obtained diluate with a cation exchanger; and
 (g) drying the diluate, obtaining a product in powder form.

2. The process of claim 1, wherein the raw milk is cold-separated.

3. The process of claim 2, wherein the raw milk is separated at a temperature in the range from 8 to 15° C.

4. The process of claim 1, wherein the lactoferrin of the column is eluated, salts are removed from the eluate, which is then dried, and the pure lactoferrin is subsequently added to the demineralised whey powder in defined amounts again.

5. The process of claim 1, wherein the permeate P1, from which lactoferrin had been removed, is concentrated before dialysis by evaporation.

6. The process of claim 1, wherein the diluate is subjected to pasteurisation and then dried.

7. The process of claim 1, wherein the diluate is subjected to spray drying or freeze drying.

8. The process of claim 1, comprising incorporating the demineralised whey powder into an infant formula.

9. The process of claim 6, wherein the pasteurization is carried out by direct steam injection.

10. The process of claim 6, wherein the pasteurization is carried out by steam infusion.

* * * * *